United States Patent [19]
Ramioulle

[11] Patent Number: 5,343,902
[45] Date of Patent: Sep. 6, 1994

[54] INTERNAL GAS REMOVAL SYSTEM FOR FUEL TANK AND METHOD OF MAKING THEREOF

[75] Inventor: Frederic Ramioulle, Auburn Hills, Mich.

[73] Assignee: Solvay Automotive, Inc., Houston, Tex.

[21] Appl. No.: 896,577

[22] Filed: Sep. 18, 1992

[51] Int. Cl.⁵ .............................................. B65D 25/00
[52] U.S. Cl. ........................................... 141/7; 141/44; 141/46; 141/59; 137/589; 137/43; 220/86.2
[58] Field of Search .......................... 141/7, 59, 44–46, 141/285; 220/86.2, 89.1; 137/587–589, 43

[56] References Cited

U.S. PATENT DOCUMENTS

| | | |
|---|---|---|
| 2,548,734 | 4/1951 | Mathey . |
| 3,643,690 | 2/1972 | Sarai ................................ 137/587 |
| 3,817,421 | 6/1974 | Andres ............................. 220/86.2 |
| 4,044,913 | 8/1977 | Brunnert . |
| 4,135,562 | 1/1979 | Martineau ......................... 141/285 |
| 4,166,550 | 9/1979 | Kleinschmit et al. ........... 220/86.2 |
| 4,261,477 | 4/1981 | Casimir et al. ................... 220/86.2 |
| 4,444,333 | 4/1984 | Anhegger ......................... 220/86.2 |
| 4,450,880 | 5/1984 | Scheurenbrand . |
| 4,625,777 | 12/1986 | Schmidt ............................ 141/286 |
| 4,714,171 | 12/1987 | Sasaki et al. . |
| 4,718,568 | 1/1988 | Dal Palû220 ..................... 86.2/ |
| 4,739,808 | 4/1988 | Schmidt . |
| 4,869,283 | 9/1989 | Oeffling et al. .................... 137/43 |
| 4,891,000 | 1/1990 | Ishii ............................... 220/86.2 X |
| 5,054,508 | 10/1991 | Benjey .............................. 137/43 |

FOREIGN PATENT DOCUMENTS

| | | |
|---|---|---|
| 2218299 | 12/1979 | Fed. Rep. of Germany ..... 220/86.2 |
| 3040160A1 | 6/1982 | Fed. Rep. of Germany . |
| 2518466 | 12/1982 | France . |
| 2650227 | 2/1991 | France . |
| 7405 | 1/1980 | Japan . |
| 2105666 | 3/1988 | United Kingdom . |

Primary Examiner—Ernest G. Cusick
Attorney, Agent, or Firm—Willian Brinks Hofer Gilson & Lione

[57] ABSTRACT

An internal gas removal system for a fuel tank is comprised of a venting system and a breathing system, both of which are placed substantially completely inside the fuel tank. The breathing system removes gases from the fuel tank while fuel is introduced into the fuel tank, while the venting system removes gases from the fuel tank while the vehicle is operated and the fuel is not introduced into the fuel tank. Both, the venting and the breathing systems are connected to their respective exit lines which exit the fuel tank through a single dedicated opening or through a filler pipe. A method of making the internal gas removal system comprises introducing the breathing and the venting systems into a blow mold and subsequently blow-molding the fuel tank around these systems.

5 Claims, 5 Drawing Sheets

INTERNAL GAS REMOVAL SYSTEM FOR FUEL TANK AND METHOD OF MAKING THEREOF

BACKGROUND OF THE INVENTION

1. Field of the Invention

The invention is directed to an internal gas (vapor) removal system for a fuel tank and a method of making thereof. The gas removal system of the invention is placed substantially completely inside the fuel tank to minimize hydrocarbon emissions from the fuel tank.

2. Description Of Related Art

Fuel tanks for internal combustion engine-powered vehicles must have a means for removing (venting) gases from the tanks. Gases (including hydrocarbon vapors) must be vented from the tank at the time when the tank is filled with fuel and during operation of the vehicle when the fuel is not introduced into the fuel tank. It is customary in the art to use two different systems for venting gases from the fuel tank for the two aforementioned purposes. A breathing system provides a means for removing gases during filling of the tank with fuel. The heretofore-used breathing systems had to be designed in such a way that the location of an opening in the tank used to remove gases therefrom during filling (fill vent) and the size of a tube attached to the fill vent enable the tank to be filled up to its usable capacity, independent of the slope of the surface supporting the vehicle at the time it is filled with fuel.

A venting system is customarily used to provide a means for gases to escape from the fuel tank while the vehicle is in operation, i.e., at the time when fuel is not introduced into the tank.

Presently used breathing systems generally require the presence of at least one fill vent nipple (attached to the fill vent), generally placed on top of the fuel tank, to which is connected a fill vent tube. The fill vent tube has to be of a sufficient diameter to enable gases from the tank to be displaced at the same rate at which the fuel is introduced into the tank. The rate of fuel introduction into a passenger automobile may vary, but is usually about 55 liters per minute; thus, the fill vent tube used in such a vehicle has to be sized to accommodate the flow of at least about 55 liters per minute. One end of the fill vent tube is normally connected to the fill vent nipple, and the other end to the filler pipe (used to introduce fuel into the tank) to enable gases to escape through the filler pipe.

The venting system also usually requires the presence of at least one nipple ("venting nipple"), also placed on top of the fuel tank. A venting tube is attached to the venting nipple. The venting tube removes gases from the fuel tank during operation of the vehicle, other than when the fuel tank is being filled with fuel. The venting tube of the venting system conducts gases to a charcoal canister wherein the hydrocarbons are adsorbed, and, subsequently, the gases are released to the atmosphere. The venting nipple is usually equipped with a rollover valve ("ROV") which prevents fuel from spilling out of the fuel tank in the event the vehicle is tipped over. The efficiency of the venting system should not be reduced by particular driving conditions, parking situations or fuel level in the tank. The fill vent tube and the venting tube are usually placed outside of the tank. To minimize hydrocarbon emissions, these tubes are made of a relatively impermeable plastic material, such as polyamide, which is relatively costly.

The presence of the aforementioned nipples, the rollover valve, the fill vent tube and the venting tube provides an opportunity for hydrocarbons to escape into the atmosphere.

The aforementioned basic requirements have forced car manufacturers to complicate the venting and breathing systems if the vehicle is expected to be driven under severe conditions (e.g., at severe tip angles) and/or under hot weather conditions. Conversely, the general regulatory trend for reducing fuel hydrocarbon emissions forces the manufacturers to reduce the number of accessories attached to the fuel system since each accessory, such as nipples or tubes, provides an opportunity for hydrocarbons to be emitted from the fuel tank into the atmosphere.

Attempts have been made heretofore to simplify the breathing and venting systems. For example, in French Patent 2,518,466, there is disclosed a breathing system wherein the fill vent tube is placed inside the filler pipe of the fuel tank. Although apparently not disclosed in this French Patent, in systems similar to that of this French Patent, it has been customary in the art to connect the venting tube, on the outside of the fuel tank, from the venting nipple to the top of the filler pipe. A rollover valve was then attached to the top of the filler pipe, and a separate tube from the rollover valve to the charcoal canister conducted hydrocarbon emissions from the filler pipe to the canister.

Other known systems also utilize a fill vent tube placed internally within the filler pipe. In such systems, there is no separate venting tube connecting the top of the fuel tank to the filler pipe. Instead, the fill vent tube placed within the filler pipe also serves as a venting tube. A nipple at the top of the filler pipe is equipped with a rollover valve and a tube from the rollover valve to a charcoal canister conducts all gases to the canister. However, a major problem in such a system is the obstruction of the filler pipe by fuel if the automobile is at an inclined position. The obstructed filler pipe, of course, is unable to allow gases to exit the tank.

Anhegger, U.K. Patent Application 2 105 666, discloses an installation for venting a fuel tank, such as that of a motor vehicle. The installation is formed by at least one collecting tank, placed in the interior of the fuel tank, and a vent line cooperating with the collecting tank. The installation is connected to an external line which terminates in the atmosphere or in an activated charcoal tank. However, Anhegger does not disclose a method of assembling the vent line within the tank during the fuel tank manufacturing process. Additionally, the vent line is apparently connected to a single external line terminating either in the atmosphere or in an activated charcoal canister tank.

German patent specification, DE30 40 160 A1 discloses a tank arrangement with a tank having at least two domes and having a vent line placed inside the tank. If any fuel is entrained within the vent line, the vent line is arranged in such a manner with respect to a fill nozzle that the vent line and the fill nozzle form an entrapment pump which empties the fluid from the vent line.

Various other fuel tanks and venting arrangements are disclosed by Mathey, U.S. Pat. No. 2,548,734, Brunnert, U.S. Pat. No. 4,044,913, Scheurenbrand, U.S. Pat. No. 4,450,880, Schmidt, U.S. Pat. No. 4,739,808, and French Patent application, Publication Number 2,650,227.

Sasaki et al., U.S. Pat. No. 4,714,171, disclose a method of separating a liquid from a vapor in the upper part of a fuel tank.

Japanese Laid Open Patent No. 745/1980, application number 79793/1978, discloses a method of forming a hollow article with an insert, comprising the steps of pre-blowing a molten parison of a thermoplastic resin; bringing an insert member held by a rod member in the parison into contact with an inner surface of the parison wall and blowing air into the parison.

One object of the present invention is to provide an improved method of assembling inside a blow-molded fuel tank at least one vent line for venting fuel gases from the fuel tank.

Another object of the invention is to provide an improved fuel tank system comprising a fuel tank and at least two vent lines placed substantially completely inside the fuel tank for removing gases from the fuel tank.

Additional objects of the invention will become apparent to those skilled in the art from the following description thereof.

SUMMARY OF THE INVENTION

One aspect of the invention is directed to a fuel tank system comprising a fuel tank, a breathing system including a fill vent tube, and a venting system including a venting tube. The fill vent tube and the venting tube are placed substantially completely inside the fuel tank. The fill vent tube is connected to a first end of a first exit line to remove gases from the fuel tank when fuel is introduced into the fuel tank. The venting tube is connected to a first end of a second exit line for removing gases from the fuel tank when the fuel is not introduced into the fuel tank.

The fuel tank contains only one opening through which the first exit line and the second exit line egress the fuel tank. A second end of the first exit line is connected to a fuel tank filler pipe, while a second end of the second exit line is connected to a rollover valve which, in turn, is connected to a charcoal canister. Preferably, the fill vent tube and the venting tube are made from polyethylene, and the fuel tank is blow-molded from polyethylene. It is also preferred to incorporate the fill vent tube and the venting tube into the fuel tank during the blow-molding process.

Another aspect of the invention is directed to a method of venting gases from a fuel tank both, at the time when fuel is introduced into the fuel tank and when the fuel is not introduced into the fuel tank. When the fuel is introduced into the fuel tank, the method comprises collecting the gases inside the fuel tank into the breathing system including the fill vent tube placed substantially completely inside the fuel tank, and conducting the gases from the fuel tank to the outside of the fuel tank through a first exit line. The fill vent tube is connected to a first end of the first exit line, and a second end of the first exit line exits the fuel tank. When the fuel is not introduced into the fuel tank, gases are collected inside the fuel tank into a venting system including a venting tube, which is placed substantially completely inside the fuel tank. The venting tube is connected to a first end of a second exit line, and a second end of the second exit line exits the fuel tank. The fuel tank contains only one opening through which both, the second end of the first exit line and the second end of the second exit line exit the fuel tank.

Another aspect of the invention is directed to a method of assembling substantially inside a blow-molded fuel tank a breathing system including a fill vent tube. The method comprises: placing the fill vent tube, attached at its distal end to a first attachment means, such as an attachment bracket, and at its proximal end to a support ring, inside of a mold for blow-molding the fuel tank; dropping a parison around the fill vent tube; closing the mold, thereby forcing the first attachment means to contact one surface of the parison and become attached to that surface of the parison; introducing a pressurized gas into the mold for blow-molding the parison against surfaces of the mold; and, opening the mold.

If the structure (i.e., the fill vent tube; the first attachment bracket; and, the support ring) does not have sufficient stiffness (rigidity) to ensure physical contact of the first attachment means with the surface of the parison when the mold is closed, the method of assembling substantially inside the blow molded fuel tank the breathing system, including the fill vent tube, utilizes a first supplemental support member. The first supplemental support member is attached to the fill vent tube, which is attached, at its distal end, to a first attachment bracket, and, at its proximal end, to a support ring. The first attachment bracket has a forward side and a rear side. The fill vent tube is then placed inside a mold for blow-molding the fuel tank, a parison is dropped around the fill vent tube, the mold is closed and a pressurized gas is introduced into the mold for blow-molding the parison against surfaces of the mold. The first attachment bracket is sized so that the closing of the mold forces the rear side of the first attachment bracket to contact one surface of the parison and become attached to that surface. The mold is then opened and the fuel tank, including the fill vent tube, is removed from the mold.

In either case, the attachment bracket preferably penetrates the surface of the parison, thereby becoming incorporated into the wall of the fuel tank. The first supplemental support member may be removed from the mold before the mold is opened or it may be left in the blow-molded fuel tank to form a part of a permanent structural support of the breathing system.

In conjunction with the method of assembling the breathing system, a venting system, including a venting tube, may also be installed in the fuel tank. Such a method comprises attaching the venting tube, at its distal end, to a second attachment means, such as a second attachment bracket and, at its proximal end, to a support ring. The support ring is preferably the same support ring, described above, as is used in conjunction with the method of assembling the breathing system inside the blow-molded fuel tank. The venting tube is then placed inside a mold for blow-molding a fuel tank, a parison is dropped around the venting tube, the mold is closed, and pressurized gas is introduced into the mold for blow-molding the parison against surfaces of the mold. The second attachment means is sized so that the closing of the mold forces the second attachment means to contact one surface of the parison, become attached to that surface and, preferably, penetrate the surface of the parison, thereby becoming incorporated (embedded) into the wall of the fuel tank. The mold is then opened and the fuel tank including the venting tube, is removed therefrom.

If the structure (i.e., the venting tube; the second attachment bracket; and, the support ring) does not have sufficient rigidity to ensure physical contact of the second attachment means with the surface of the parison, the method of assembling the venting system, including the venting tube substantially inside the fuel tank utilizes a second supplemental support member, which is attached to the venting tube. The venting tube is attached, at its distal end, to a second attachment means and, at its proximal end, to a support ring. The second attachment means has a forward side and a rear side. The venting tube is then placed inside a mold for blow-molding the fuel tank, a parison is dropped around the venting tube, the mold is closed and pressurized gas is introduced into the mold. The closing of the mold forces the rear side of the second attachment means to contact one surface of the parison, and become attached to that surface of the parison. The second attachment bracket preferably penetrates the surface of the parison, thereby penetrating the wall of the fuel tank and becoming incorporated into the wall of the fuel tank. The mold is then opened and the fuel tank system is removed therefrom. The second supplemental support member may be removed from the mold before the mold is opened or it may be left in the blow-molded fuel tank to form a part of a permanent structural support of the venting system.

The first attachment means may be used to perform the function of both, the first and second attachment means, or the second attachment means may be separate from the first attachment means.

If the breathing and venting systems are to be installed in a fuel tank which is not blow-molded, they can be installed in such a fuel tank either simultaneously or consecutively. If the breathing and venting systems are to be installed in a blow-molded fuel tank, they are installed simultaneously.

DETAILED DESCRIPTION OF THE INVENTION

In the most preferred embodiment of the invention, the fuel tank is made of a thermoplastic material, such as polyethylene, most preferably high density polyethylene (HDPE). Accordingly, for purposes of illustration, the following description will be set forth in conjunction with the most preferred embodiment utilizing a high density polyethylene fuel tank. However, this is not to be interpreted as limiting the scope of the invention to the most preferred embodiment thereof.

Figure 1:
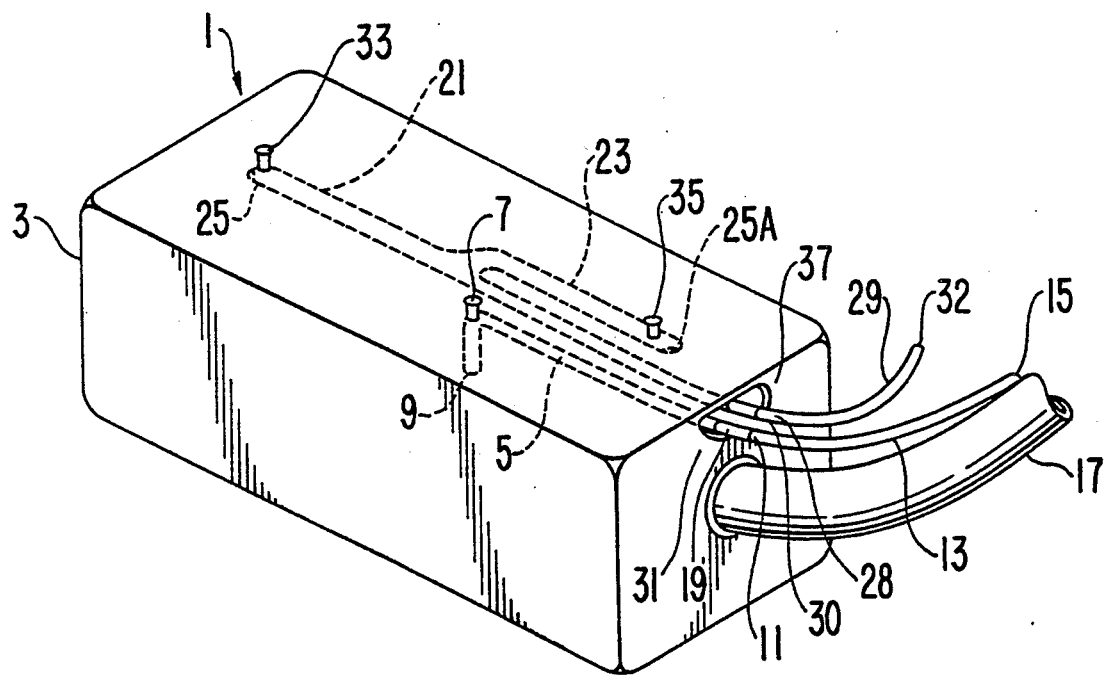
FIG. 1 is a perspective view of one embodiment of the fuel tank system of the invention.

Turning now to the drawings, illustrating exemplary embodiments of the invention, FIG. 1 shows a fuel tank system 1 comprising a fuel tank 3 and placed within it a breathing system and a venting system. The breathing system comprises a fill vent tube 5 attached to the inside of an upper wall of the fuel tank at the attachment point 7. A fill vent nipple 9, preferably pointing downward into the fuel tank is attached to the fill vent tube. The fill vent tube is placed substantially completely inside the fuel tank. Substantially no portion of the fill vent tube is placed on top of the fuel tank on the outside thereof, as was customary in prior art. The fill vent tube is connected to a first end 11 of a first exit line 13. The second end 15 of the first exit line 13 is connected to the outside top portion of the filler pipe 17 and conducts gases inside the filler pipe 17 to allow gases from the fuel tank to be vented to the atmosphere or to be re-absorbed by a hydrocarbon vapor recovery system of a fuel nozzle used at the filling station while fuel is introduced into the fuel tank. The fill vent tube is connected to the first end of the first exit line through a quick-fit connection 19, the details of which will be described hereinafter. The fill vent tube, the quick-fit connection 19 and the first exit line 13 are dimensioned so as to allow gases from the tank to exit the tank at the rate equivalent to the rate of fuel introduction into the fuel tank. Gasoline is usually introduced into a passenger automobile fuel tank at the rate of about 55 liters per minute. Accordingly, in such an exemplary embodiment of the utilization of the venting system of the invention, the fill vent tube, the quick-fit connection 19, and the first exit line 13 must have such dimensions as to allow gases to exit the tank at substantially the same or greater rate.

The fuel tank system also comprises a venting system which is comprised of a venting tube 21 which has a branch 23 connected thereto. The venting tube 21 and the branch 23 are placed substantially completely inside the fuel tank. Substantially no portion of the venting tube (or the branch) is placed on top of the fuel tank, on the outside thereof, as was customary in prior art. Nipples 25 and 25A are connected to the venting tube 21 and to the branch 23, respectively. The nipples 25 and 25A, similarly to the nipple 9, are opened and pointed downward into the bottom of the tank to enable the venting system to remove gases from the tank when fuel is not introduced into the fuel tank, and therefore the filler pipe 17 is closed to the atmosphere. The venting tube 21 is connected by a quick-fit connector 27 to a first end 30 of a second exit line 29. A second end 32 of the second exit line 29 is connected to a rollover valve (not shown). The rollover valve is, in turn, connected to a charcoal canister (also not shown), which adsorbs hydrocarbon gases from the gases passing through it. The fill vent tube 5 and the venting tube 21 egress the fuel tank through a single opening 31. In the most preferred embodiment utilizing an HDPE fuel tank, either the venting tube and the fill vent tube or the first exit line and the second exit line are encapsulated during blow-molding of the tank into the wall of the tank shown in FIG. 1 as containing the opening 31. Accordingly, that tank wall and the tubes or the lines form a unitary shape which hermetically seals the fuel tank. The opening 31 shown in FIG. 1, is therefore filled-in by the HDPE and no additional sealing element, such as a gasket, is necessary to seal the opening.

The fill vent tube 5 and the venting tubes 21 and 23 are placed substantially at such a location as to enable these tubes to remove gases from the fuel tank even if the vehicle containing the fuel tank is placed at an incline.

The fill vent tube 5 and the venting tube 21 are connected to the upper inside surface of the fuel tank through the attachment means 7, 33 and 35, respectively. Such attachment means, in the most preferred embodiment described herein is preferably made of HDPE and is embedded (welded) into the surface of the tank. The attachment means preferably has the shape of a bracket.

Figure 2:
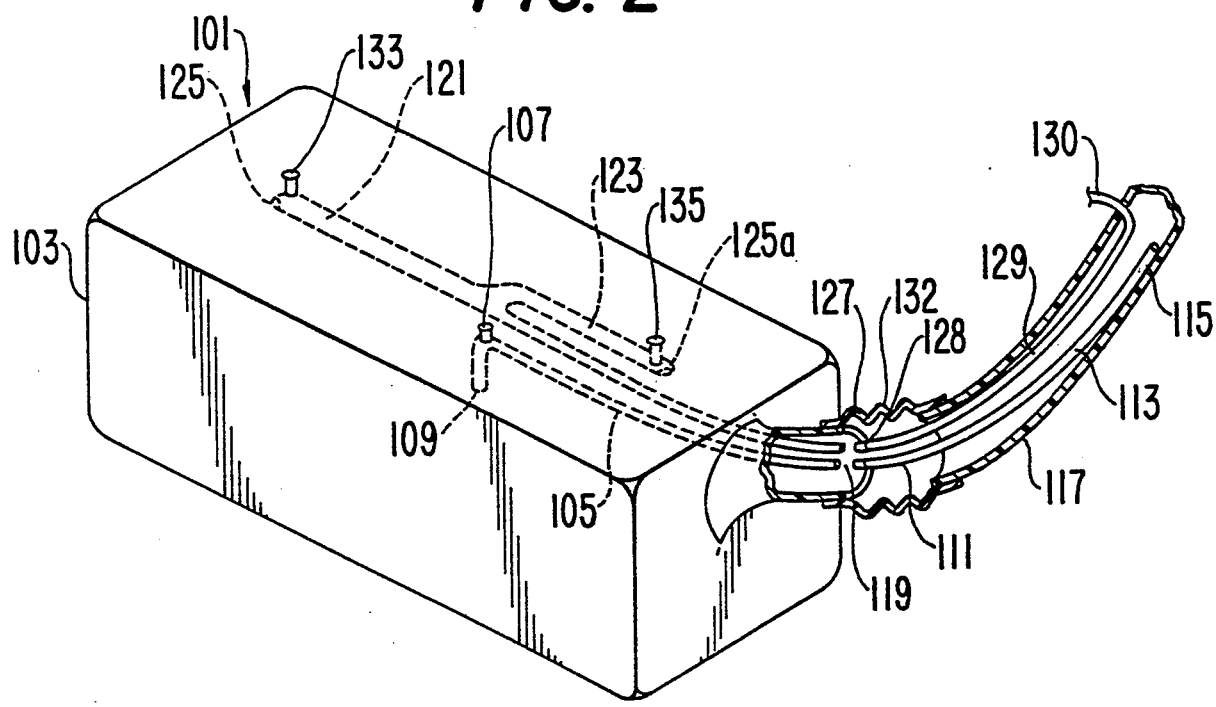
FIG. 2 is a perspective view of an alternative embodiment of the fuel tank system of the invention.

FIG. 2 illustrates an alternative embodiment of the invention. Whenever possible, all numerals used in FIG. 2 will be the same as in FIG. 1 with a prefix of 100. For example, the fuel tank system 1 of FIG. 1 corresponds to a fuel tank system 101 of FIG. 2.

The fuel tank system 101 comprises a fuel tank 103 which contains a breathing system and a venting system, both placed substantially completely inside the fuel tank. The breathing system comprises a fill vent tube 105 connected by a quick-fit connection 119 to a first end 111 of a first exit line 113. A second end 115 of the first exit line 113 opens into the filler pipe 117, thereby enabling gases from the fuel tank to be directed from the fuel tank to the atmosphere during the filling of the fuel tank with fuel. The gases enter the breathing system through a nipple 109, connected to the top, inner surface of the fuel tank through an attachment means 107, preferably brackets. As in the embodiment of FIG. 1, the fill vent tube, the quick-fit connection 119 and the first exit line 113 are dimensioned so as to enable the gases to exit the fuel tank at substantially the same rate at which the fuel is introduced into the fuel tank.

The fuel tank system of FIG. 2 also includes a venting system which comprises a venting tube 121, containing a branch 123. The venting system provides a means for venting the gases out of the fuel tank when fuel is not introduced into the fuel tank. The venting tube 121 has a venting nipple 125 attached thereto and the branch 123 has a venting nipple 125A attached thereto. The nipples 125 and 125A are attached to the inner top surface of the fuel tank by means of attachment means 133 and 135, respectively. The nipples 125 and 125A are opened at the bottom end and are facing downward to enable gases from the fuel tank to be removed from the fuel tank. The venting tube 121 is connected via a quick-fit connection 127 to a first end 128 of a second exit line 129. The second end of the second exit line 129 is connected to a rollover valve 130, which, in turn, is connected to a charcoal canister (not shown). A convoluted, flexible hose 132 may optionally be provided in the filler pipe 117 to provide access to the quick-fit connection section for maintenance and to facilitate the connection of the fill vent tube to the first exit line and of the venting tube to the second exit line. The hose 132 may be substituted by any other suitable means to provide access to the quick fit connection section.

It should be noted that in the embodiment of FIG. 2, the fill vent tube 105 and the venting tube 121 exit the fuel tank through the first exit line 113 and the second exit line 129, respectively. The first exit line 113 and the second exit line 119 are placed inside the filler pipe 117.

Accordingly, no additional opening is necessary in the fuel tank for providing exit of the fill vent tube and the venting tube. This is to be contrasted with the embodiment of FIG. 1 wherein a separate opening 31 was provided for the fill vent tube and the venting tube. Thus, the embodiment of FIG. 2 reduces even further the emission of gases into the atmosphere as compared to the embodiment of FIG. 1.

Figure 3:
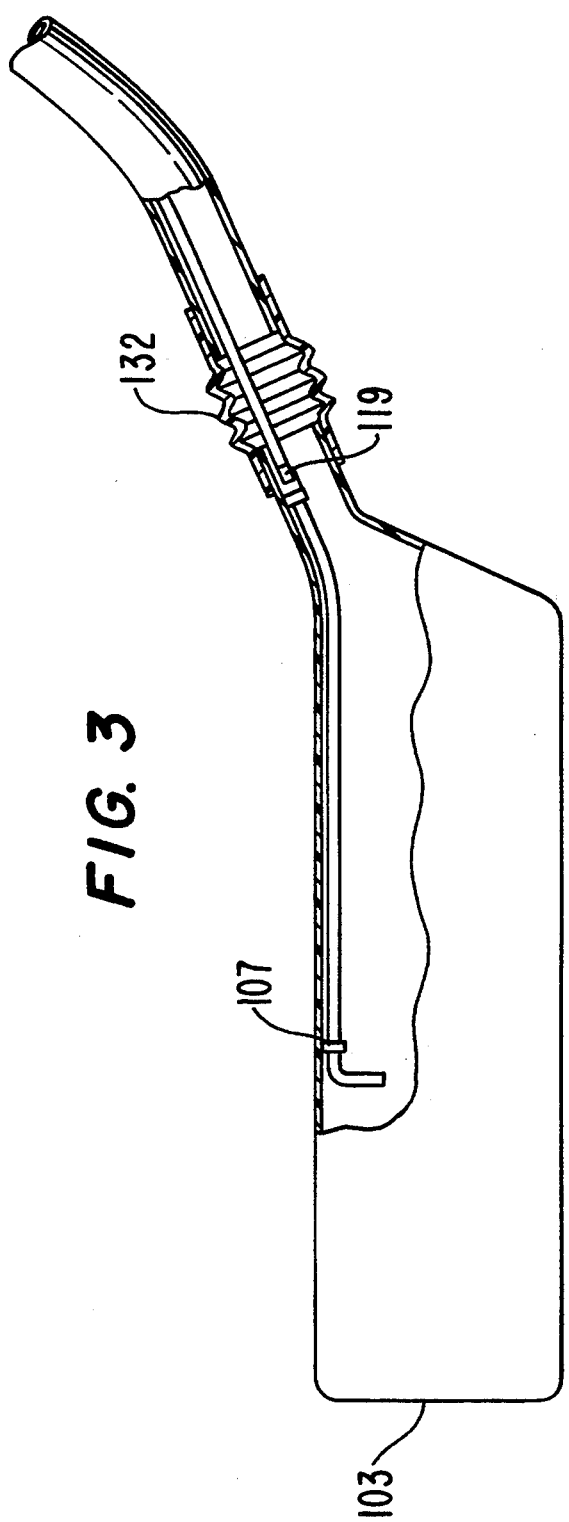
FIG. 3 is a side view of the fuel tank system of FIG. 2.

FIG. 3 is a simplified side view of the embodiment of FIG. 2.

In the embodiment of FIG. 1, the fill vent tube, the venting tube and the nipples are also preferably made from polyethylene because these components are placed substantially completely within the fuel tank. However, the first and the second exit lines are preferably made of polyamide or other material having lesser permeability than polyethylene, because these exit lines are placed outside of the fuel tank in that embodiment.

In the embodiment of FIGS. 2 and 3 of the invention, it is preferred that the fill vent tube, the venting tube, the first exit line and the second exit line be made from polyethylene because it is a relatively inexpensive material and it can be shaped into any desired form. Since all of the tubes, lines, nipples and connections are located substantially inside the fuel tank or the filler pipe, permeability of the material used to construct these components is irrelevant because any gases permeating the components would be contained within the fuel tank system.

FIGS. 4–9 illustrate the embodiments of the present invention directed to a method of assembling inside a blow-molded fuel tank a breathing system and a venting system of the present invention. Whenever possible, elements corresponding to those of FIG. 1 will be numbered in FIGS. 4–9 with the same numerals as in FIG. 1 with a prefix of 200. For example, the attachment means 33 of FIG. 1 corresponds to the first attachment means (e.g., a first bracket) 233 of FIG. 4.

Figure 4:
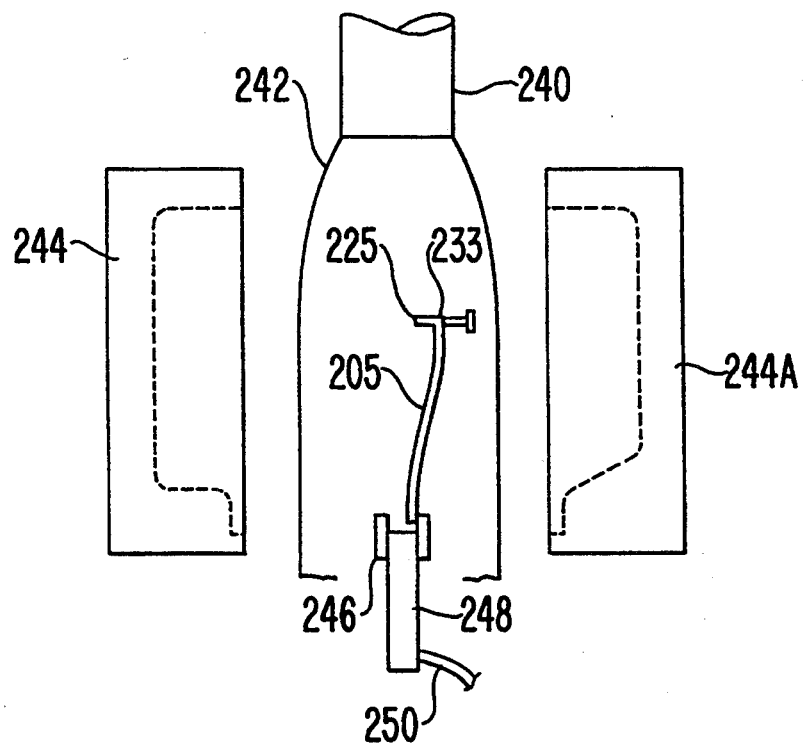
FIG. 4 is a cross-section of a mold utilized in one embodiment of a method of making the fuel tank system of the invention with the mold in an opened position.

The breathing and venting systems are introduced into the fuel tank during the blow molding of the tank. In the method embodiment of the invention, the blow-molded tank is made in a conventional blow-molding machine, a portion of which is schematically illustrated in FIG. 4. The method of the invention will be described hereinafter in conjunction with the encapsulation of a breathing system into the fuel tank. This illustrative embodiment, however, is not to be construed as being limited only to the encapsulation of the breathing system. The same method may be used to encapsulate the venting system simultaneously with the breathing system in the fuel tank.

Figure 5:
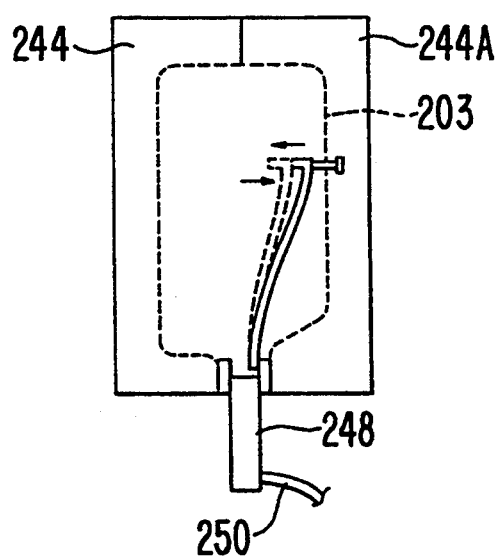
FIG. 5 is a cross-section of a mold utilized in the embodiment of FIG. 4, with the mold in a closed position.

Turning now to FIG. 4, a support ring 246 is attached to a blow pin 248. A proximal end of the fill vent tube 205 is attached to the support ring 246, and a distal end of the fill vent tube 205 is attached to a first attachment means, such as a bracket 233. The blow pin 248 has a line 250 attached thereto through which pressurized gas is introduced into the blow pin and then into the mold. The support ring 246 will be encapsulated into the body of the fuel tank during blow-molding and will become a part of the quick-fit connection between the breathing system and a first exit line connecting the breathing system to the outside of the fuel tank. A parison 242 is dropped around the fill vent tube supported by the blow pin 248. A mold, comprising sections 244, 244A, is then closed (FIG. 5) and pressurized gas is introduced into the mold through the blow pin 248. The first attachment bracket 233 is sized so that the closing of the mold forces the bracket to penetrate the surface of the parison (as shown in FIG. 5). Accordingly, the portion of the bracket penetrating the surface of the parison becomes embedded in and welded to that surface of the parison under the pressure and temperature conditions in the mold. The pressurized gas blow-molds the parison against surfaces of the mold, to aid in shaping the fuel tank. In the embodiment of FIGS. 4 and 5, the breathing system has sufficient rigidity so that the closing of the mold pushes the pipe network represented by the fill vent tube 205 towards the surface of the parison and forces the first attachment bracket against the surface of the parison, thereby forcing the first attachment bracket to penetrate the surface of the parison.

The method described above and schematically illustrated in FIGS. 4-5 may also be used to incorporate a venting system into the fuel tank. The venting tube of the venting system is attached to the blow pin through a support ring at its proximal end, and to a second attachment means, such as a bracket, at its distal end. The first attachment bracket preferably performs the function of the first and second attachment bracket. Alternatively, a second attachment bracket, separate from the first attachment bracket, may be provided. In such an alternative embodiment, the second attachment bracket is substantially the same as the first attachment bracket 233. The method then follows the steps enumerated above for attaching the breathing system to the fuel tank. In particular, a parison is dropped around the venting tube and the mold is closed. This forces the second attachment bracket to contact one surface of the parison, penetrate that surface and become welded to that surface under the heat and pressure conditions of the mold. The mold is then opened.

Figure 6:
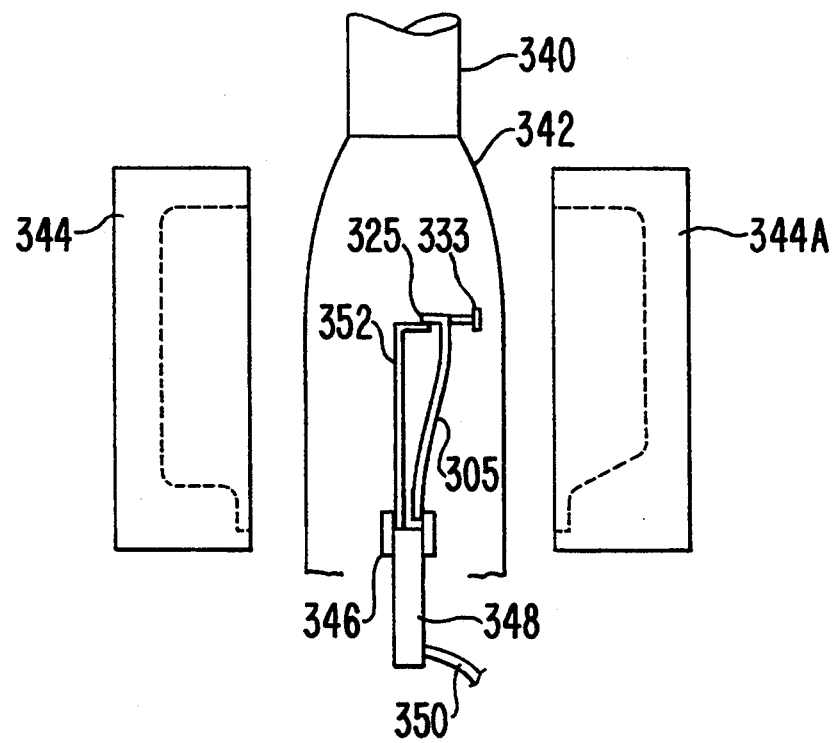
FIG. 6 is a cross-section of a mold utilized in an alternative embodiment of a method of making the fuel tank system of the invention, with the mold in an opened position.
Figure 7:
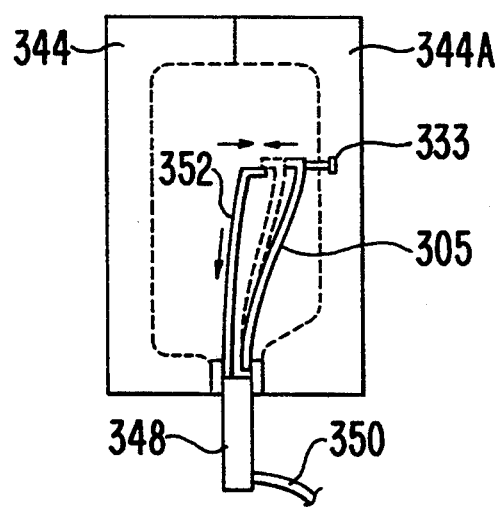
FIG. 7 is a cross-section of the mold utilized in the embodiment of FIG. 6, with the mold in a closed position.

If the rigidity of the structure (i.e., the fill vent tube; the attachment means; and the support ring) is not sufficient to enable the mold to force the attachment bracket to contact and penetrate the surface of the parison, it is desirable to use a supplemental support member inside a mold. The supplemental support member is attached to the breathing system or the venting system, as represented by the fill vent tube or the venting tube, respectively. This embodiment is schematically illustrated in FIGS. 6 and 7. As in the embodiments discussed above, whenever possible, elements similar to those of FIGS. 4 and 5 will be designated in FIGS. 6 and 7 with the same numerals as in FIGS. 4 and 5, but will be preceded by a prefix of 300. For example, a parison 242 of FIG. 4 corresponds to a parison 342 of FIG. 6. In the embodiment of FIGS. 6 and 7, the fill vent tube 305 is attached at its distal end to an attachment means 333 and, at its proximal end, to a support ring 346 which, as discussed above, will be encapsulated into the fuel tank during molding and could be used as a part of a quick-fit connection mechanism. A first supplemental support member 352 is attached to the fill vent tube 305 in front of the fill vent tube. A parison is dropped around the fill vent tube and the blow pin, the mold is closed, and pressurized gas is introduced into the mold through the blow pin 348. The closing of the mold forces the supplemental support member 352 and therefore the fill vent tube 305 against a surface of the parison. The first attachment means is sized so that the closing of the mold also forces the rear side of the first attachment means 333 to penetrate the surface of the parison and become embedded therein. The mold is subsequently opened and the tank, including the breathing and/or the venting system, is removed from the mold. The supplemental support member 352 may be removed from the mold through the blow pin 348 before the mold is opened.

To assemble the venting system, in the method illustrated in FIGS. 6 and 7, the venting system, as represented by a venting tube, is also attached at its proximal end, to the blow pin 348 through a support ring 346, and at its distal end to an attachment means 333 which, during the blow-molding step is forced to come into contact with the wall of the parison and, preferably, penetrate that wall in the same manner as described above for the attachment bracket attached to the fill vent tube of the breathing system. The fill vent tube of the breathing system and the venting tube of the venting system are incorporated into the fuel tank at the same time as a single assembly.

Figure 8:
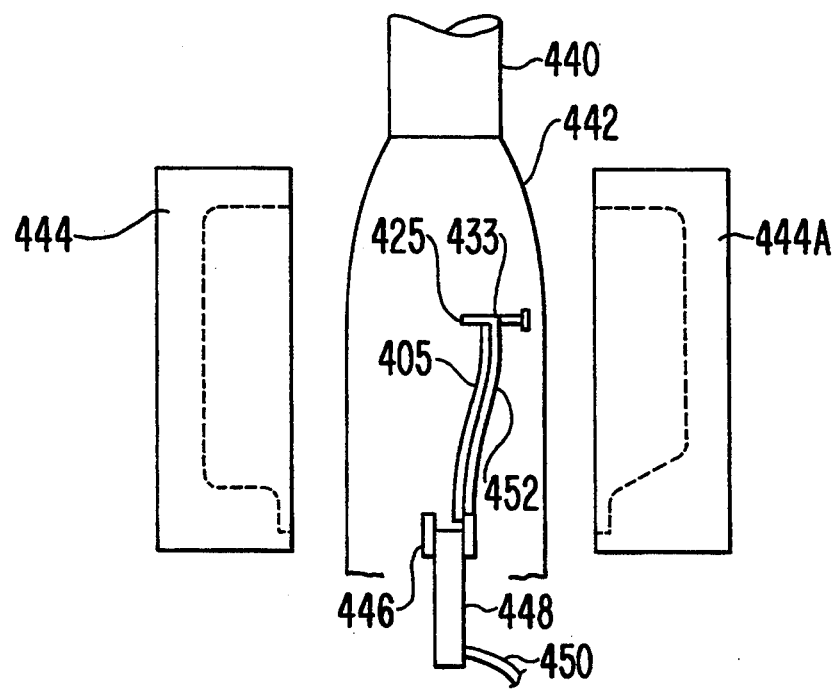
FIG. 8 is a cross-section of a mold utilized in yet another alternative embodiment of a method of making the fuel tank system of the invention, with the mold in an opened position.
Figure 9:
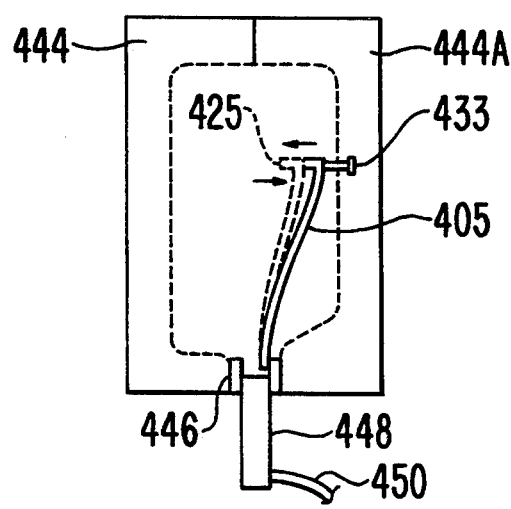
FIG. 9 is a cross-section of the mold utilized in the embodiment of FIG. 8, with the mold in a closed position.

FIGS. 8 and 9 illustrate the embodiment of the invention wherein the supplemental support member is placed between the rear side of the attachment means and the surface of the parison penetrated by the attachment means. As in the embodiment described above, whenever possible, the elements of FIGS. 8 and 9 which are the same or equivalent to those of FIGS. 6 and 7 will be designated by the same numerals as in FIGS. 6 and 7, but they will be preceded by a prefix of 400. For example, the mold comprising sections 344 and 344A of FIG. 6 corresponds to a mold comprising sections 444 and 444A of FIG. 8.

In the embodiment of FIGS. 8 and 9, a breathing system, as represented by a fill vent tube 405, is attached at its proximal end to a support ring 446 and at its distal end to a first attachment means 433. The fill vent tube 405 terminates with a nipple 425. A supplemental support member 452 having greater rigidity than the structure of the breathing system (i.e., the fill vent tube 405, the first attachment means 433 and the support ring 446), is attached to the fill vent tube substantially along the entire length thereof, as illustrated in FIG. 8. The first attachment means 433 (such as a bracket) has a forward side and a rear side. As also illustrated in FIG. 8, the supplemental support member 452 is placed along the rear side of the fill vent tube, and therefore behind the rear side of the first attachment means. After the supplemental support member is attached to the fill vent tube, the fill vent tube is placed inside a mold for blow-molding the fuel tank, and a parison 442 is dropped around the fill vent tube. The mold is then closed and pressurized gas is introduced into the mold through a blow pin 448. The first attachment means 433 is sized so that the closing of the mold forces the rear side of the attachment means to contact one surface of the parison and become embedded in that surface under the pressure and temperature conditions of the blow-molding operation. The mold is then opened and the fuel tank with the network of lines inside of it is removed therefrom. In this embodiment, the rear side of the attachment means penetrates the surface of the parison, thereby becoming incorporated into the fuel tank. The supplemental support member may be removed from the mold, e.g., through the blow pin 448, before the mold is opened. Alternatively, the supplemental support member may be left in the blow-molded fuel tank to form a permanent part of a structural support of the breathing system.

The method illustrated in FIGS. 8 and 9, described above, may also be used to incorporate into the fuel tank the venting system. To do so, the fill vent tube of the breathing system, used in FIGS. 8 and 9, as described above, is replaced by a venting tube of the venting system, and all of the steps described above in conjunction with FIGS. 8 and 9 are repeated with the venting tube of the venting system.

Alternatively, the venting system may be incorporated into the fuel tank simultaneously with the breathing system by attaching the venting and the breathing systems (as represented by the fill vent tube and the venting tube, respectively) to the support ring 446 and to the first attachment means 433 and repeating all of the steps described above in conjunction with FIGS. 8 and 9.

In all embodiments of the invention wherein a supplemental support member is utilized, if it is desired to remove the supplemental support member from the mold before the mold is opened, it can be accomplished in any suitable manner known to those skilled in the art. For example, a vertically-movable steel bar which forms the supplemental support member can be placed inside the blow pin (448 in FIGS. 8 and 9). The steel bar is used to remove the supplemental support member from the mold before the mold is opened. A similar technique has been used heretofore to weld a reservoir for a fuel pump inside a fuel tank and the adaptation thereof to this embodiment of the invention will be apparent to those skilled in the art.

The quick-fit connection used in all embodiments of the invention to connect the fill vent tube to the first exit line and the venting tube to the second exit line is comprised of any standard type of connector available on the market having suitable size.

In all embodiments of the invention, the fuel tank system is designed to provide enough flexibility thereto to accommodate deformations which may be caused by pressure/vacuum fluctuations.

Although the invention was described above in conjunction with specific, exemplary embodiments, several variations of these embodiments are possible and they are within the scope of my invention. The breathing and venting systems of the invention may be incorporated into a fuel tank which is made of a material other than a thermoplastic material used in the construction of the embodiments described above and illustrated in FIGS. 1–9. Suitable alternative materials of construction for such a fuel tank are metal, e.g., stainless steel. If the fuel tank is made of a material other than a thermoplastic material, the method of making the fuel tank of the embodiments of FIGS. 4–9 cannot be utilized, as will be apparent to those skilled in the art.

If a fuel tank is made of a metal, the fill vent tube and the venting tube are attached to the upper inside surface of the fuel tank by any suitable means, such as an adhesive, or by welding or clipping the attachment means, e.g., the attachment brackets exemplified in the herein-described embodiments. If the welds are used, the attachment means would be designed so that the tank can deform without straining the welds. Depending on the material of construction of the fuel tank, the attachment means exemplified by the attachment means 7, 33 and 35 in FIG. 1, may be welded to the fuel tank, if the fuel tank is made out of metal, melted or otherwise incorporated into the upper surface of the fuel tank, if the latter is made out of plastic. The fill vent tube and the venting tube are placed substantially completely within the fuel tank 3.

If the fuel tank is made of a material other than a thermoplastic material, a suitable means (not shown) for sealing an opening, such as the opening 31, for the venting tube and the fill vent tube or the first exit line and the second exit line must be used to prevent hydrocarbon emissions from exiting the fuel tank through the opening. The sealing means may have any construction which would minimize or substantially eliminate the emission of hydrocarbons. A fluoro elastomer gasket is an example of a suitable sealing means.

The fill vent tube, the venting tube, the first and second exit lines, the quick-fit connections and all other components of the breathing and venting systems may be made in any desired manner from any suitable materials, such as polyethylene, polyamide or polyacetal. In one preferred embodiment, the fill vent tube and the venting tube are made by blow-molding because of a relatively complex shape of these tubes. The attachment means, such as an attachment bracket, and the support ring are injection-molded in another preferred embodiment.

The pressurized gas used in all embodiments to blow-mold the fuel tank is any gas which may be used in such a blow-molding process, such as air, nitrogen or fluorine.

The embodiments described above provide a number of significant advantages as compared to similar systems of the prior art. Because two separate systems for removing gases from the tank, a breathing system for venting the tank while fuel is introduced into it and a venting system for venting the tank while fuel is not introduced into the tank, are used, the fuel system is substantially the same as heretofore used by automobile manufacturers. Therefore automobile manufacturers are not likely to be reluctant to use it since they are familiar with similar systems.

The breathing and venting systems of the fuel tank system of the invention are placed substantially completely within the fuel tank, thereby minimizing the release of hydrocarbon emissions into the atmosphere. The use in one embodiment of a single dedicated opening for the first and second exit lines minimizes the release of hydrocarbon emissions into the atmosphere, as compared to prior art systems which used multiple breathing and venting nipples and other accessories on the outside of the fuel tank. The use of the filler pipe in another embodiment as the conduit for the egress of the first and second exit lines from the fuel tank additionally decreases the emissions into the atmosphere because no additional openings are made in the tank for the breathing and venting systems. Thus, in this embodiment, no openings dedicated to the breathing and venting systems are made in the fuel tank.

In all embodiments of the invention, the breathing and the venting systems can be made from inexpensive and relatively permeable materials, such as polyethylene. Permeability of such materials to hydrocarbon gases is not critical because the breathing and venting systems are placed substantially completely within the fuel tank. Accordingly, any hydrocarbon emissions are contained within the fuel tank and are not released into the atmosphere. This eliminates the need to use relatively expensive materials, such as polyamide, which have lower permeability to hydrocarbon gases. The aforementioned substitution of the materials of construction for the breathing and venting systems may provide significant savings to an automobile manufacturer or to a supplier of automobile components to such a manufacturer. The savings are even greater with the embodiments utilizing the filler pipe as a point of egress of the first and second exit lines. In this embodiment, the first and second exit lines may also be made of relatively inexpensive and permeable materials, such as polyethylene, since the exit lines are also placed substantially completely within the fuel tank system. Thus, any hydrocarbon emissions are contained within the system and release of the emissions into the atmosphere is minimized.

The embodiment directed to the method of incorporating the breathing and venting systems into the fuel tank also provides significant advantages. The method of incorporating the breathing and venting systems into the fuel tank combines that function with blow-molding the fuel tank itself, thereby providing significant cost advantage to the manufacturer by eliminating additional processing steps necessitated by prior art methods which relied on the assembly of the venting and breathing systems in the fuel tank after the fuel tank had been manufactured. The use of the quick-fit connection provides a convenient means for the manufacturer and the user to assemble and disassemble, if necessary, the breathing system to or from the first exit line and the venting system to or from the second exit line, respectively.

It will be apparent that specific embodiments discussed above can be successfully repeated with ingredients equivalent to those generically or specifically set forth above and under variable process conditions.

It is therefore intended that the foregoing detailed description be regarded as illustrative rather than limiting, and that it be understood that it is the following claims, including all equivalents, which are intended to define the scope of this invention.

I claim:

1. A method of venting gases from a fuel tank at the time fuel is introduced into the fuel tank and when the fuel is not introduced into the fuel tank, comprising, at the time the fuel is introduced into the fuel tank, collecting the gases inside the fuel tank into a breathing system, including a fill vent tube placed substantially inside the fuel tank and a first exit line, the fill vent tube connected to a first end of the first exit line and, at the time the fuel is not introduced into the fuel tank, collecting the gases inside the fuel tank into a venting system, including a venting tube and a second exit line, place substantially inside the fuel tank, the venting tube connected to a first end of the second exit line, and conducting the gases outside of the fuel tank through a second end of the first exit line and a second end of the second exit line, the fill vent tube and the venting tube egressing the fuel tank through a single opening in the fuel tank.

2. A fuel tank system comprising:
   a. a fuel tank;
   b. a breathing system including a fill vent tube and a first exit line; and
   c. a venting system including a venting tube and a second exit line; the fill vent tube place substantially inside the fuel tank, the fill vent tube connected to a first end of the first exit line for venting gases from the fuel tank, at the time that fuel is introduced into the fuel tank, and the venting tube placed substantially inside the fuel tank, the venting tube connected to a first end of the second exit line for venting gases from the fuel tank when the fuel is not introduced into the fuel tank, the fuel tank containing only one opening through which the first exit line and the second exit line egress the fuel tank.

3. A fuel tank system of claim 2, wherein a second end of the first exit line is connected to a fuel tank filler pipe.

4. A fuel tank system of claim 3, wherein a second end of the second exit line is connected to a rollover valve, which is connected to a charcoal canister.

5. A fuel tank system of claim 2, wherein the fill vent tube and the second exit line are made from polyethylene.

* * * * *

UNITED STATES PATENT AND TRADEMARK OFFICE
CERTIFICATE OF CORRECTION

PATENT NO. : 5,343,902
DATED : September 6, 1994
INVENTOR(S) : Frederic Ramioulle It is certified that error appears in the above-indentified patent and that said Letters Patent is hereby corrected as shown below:

On Cover Page:

item [21], please change "Appln. No.: 896,577" to read --Appln. No.: 946,577--.

Signed and Sealed this

Sixth Day of December, 1994

Attest:

BRUCE LEHMAN

Attesting Officer        *Commissioner of Patents and Trademarks*